US009858060B2

(12) United States Patent
Barros et al.

(10) Patent No.: US 9,858,060 B2
(45) Date of Patent: Jan. 2, 2018

(54) AUTOMATED DEPLOYMENT OF A PRIVATE MODULAR CLOUD-COMPUTING ENVIRONMENT

(71) Applicant: International Business Machines Corporation, Armonk, NY (US)

(72) Inventors: James R. Barros, Raleigh, NC (US); Richard B. Ehrhardt, Castle Hill (AU); Simon J. Kofkin-Hansen, Victoria (AU); William B. Padman, Russell Lea (AU)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 14/273,859

(22) Filed: May 9, 2014

(65) Prior Publication Data

US 2015/0324182 A1    Nov. 12, 2015

(51) Int. Cl.
*G06F 9/445* (2006.01)
*G06F 9/455* (2006.01)

(52) U.S. Cl.
CPC ............ *G06F 8/61* (2013.01); *G06F 9/44505* (2013.01); *G06F 9/455* (2013.01); *G06F 9/45558* (2013.01)

(58) Field of Classification Search
CPC ............. H04L 41/0803; H04L 63/0272; G06F 9/45558; G06F 2009/45595
See application file for complete search history.

(56) References Cited

U.S. PATENT DOCUMENTS 8,631,458 B1    1/2014 Banerjee
2011/0126197 A1    5/2011 Larsen et al.
(Continued)

OTHER PUBLICATIONS

Gregor von Laszewski et al., Design of an Accounting and Metric-based Cloud-shifting and Cloud-seeding framework for Federated Clouds and Bare-metal Environments, ACM, 2012, retrieved online on Aug. 11, 2017, pp. 25-32. Retrieved from the Internet: <URL: http://delivery.acm.org/10.1145/2380000/2378982/p25-vonlaszewski.pdf?ip=151.207.250.71&id=237898>.*

(Continued)

*Primary Examiner* — Hanh T Bui
(74) *Attorney, Agent, or Firm* — Schmeiser, Olsen & Watts, LLP; John Pivnichny

(57) ABSTRACT

A method and associated systems for automated deployment of a private modular cloud-computing environment. A processor receives and analyzes user requirements, then uses those requirements to select and optimize module packages that direct automatic installations & configurations of modules of the private modular cloud-computing environment. These packages provide resources and instructions that let the processor first validate a base computing platform as being able to physically support desired virtualized cloud platform and services, then automatically install and configure the cloud's virtualization layer, cloud-management stack, virtual infrastructure, cloud services, applications, middleware, and other components onto the base platform. The processor analyzes and confirms the success of each deployment step of each module package as the step is performed. Module packages may be saved, revised, and reused to identify, update, duplicate, or optimize modules of the deployed cloud platform.

18 Claims, 5 Drawing Sheets

(56) References Cited

U.S. PATENT DOCUMENTS

| | | | |
|---|---|---|---|
| 2011/0153684 A1* | 6/2011 | Yung | G06F 9/45533 707/805 |
| 2012/0266168 A1* | 10/2012 | Spivak | G06F 9/5055 718/1 |
| 2013/0036213 A1* | 2/2013 | Hasan | H04L 67/1097 709/223 |
| 2013/0042003 A1 | 2/2013 | Franco et al. | |
| 2013/0086256 A1* | 4/2013 | Sasatani | G06F 15/173 709/224 |
| 2013/0185729 A1 | 7/2013 | Vasic et al. | |
| 2013/0198384 A1* | 8/2013 | Kirsch, II | G06F 15/161 709/226 |
| 2013/0246922 A1* | 9/2013 | Doerr | H04L 41/22 715/735 |
| 2013/0297773 A1 | 11/2013 | Ashok et al. | |
| 2013/0311778 A1* | 11/2013 | Cherukuri | H04L 41/0803 713/171 |
| 2014/0068053 A1 | 3/2014 | Ravi et al. | |
| 2014/0075431 A1* | 3/2014 | Kumar | G06F 8/61 717/175 |
| 2014/0109083 A1 | 4/2014 | Scheidel et al. | |

OTHER PUBLICATIONS

Simon Kofkin-Hansen, IBM Private Modular Cloud, A more scalable, secure, rapidly-implemented and automated PaaS and IaaS private cloud infrastructure, 2013, 28 pages, SSP03191-USEN-00, Publicly presented on: Sep. 17, 2013 (IBM/ANZ Bank teleconference), Oct. 22, 2013 (IBM/Bendigo Telco teleconference), Nov. 14, 2013 (Face-to-Face Bendigo Bank presentation),Nov. 28, 2013 (Face-to-Face GE Capital presentation).

Simon Kofkin-Hansen, IBM Private Modular Cloud, A more scalable, security-rich, rapidly-implemented and automated PaaS and IaaS private cloud infrastructure, 2014, 41 pages, SSP03191-USEN-02, Publicly presented on: Apr. 24, 2014 (Walgreens/IBM Teleconference), Apr. 27, 2014 (IBM/Westpac Teleconference). Apr.

IBM SmartCloud Provisioning V2.3 simplifies the creation and administration of cloud services, IBM United States Software Announcement 213-379, dated Oct. 22, 2013, 17 pages.

Lu et al., Pattern-based Deployment Service for Next Generation Clouds, Jun. 28, 2013, 8 pages.

\* cited by examiner

AUTOMATED DEPLOYMENT OF A PRIVATE MODULAR CLOUD-COMPUTING ENVIRONMENT

TECHNICAL FIELD

The present invention relates to automated deployment of a private cloud network.

STATEMENT REGARDING PRIOR DISCLOSURES BY THE INVENTOR OR A JOINT INVENTOR

The following disclosure(s) are submitted under 35 U.S.C. 102(b)(1)(A):
1. IBM PRIVATE MODULAR CLOUD (v. SSP03191-USEN-00)
  ("IBM Private Modular Cloud_082013.PPT")
  Simon Kofkin-Hansen, author
  Publicly presented on:
    Sep. 17, 2013 (IBM/ANZ Bank teleconference)
    Oct. 22, 2013 (IBM/Bendigo Telco teleconference)
    Nov. 14, 2013 (Face-to-Face Bendigo Bank presentation)
    Nov. 28, 2013 (Face-to-Face GE Capital presentation).
2. IBM PRIVATE MODULAR CLOUD (v. SSP03191-USEN-02)
  ("IBM Private Modular Cloud SSP03191USEN-2.PPT")
  Simon Kofkin-Hansen, author
  Publicly presented on:
    Apr. 24, 2014 (Walgreens/IBM Teleconference)
    Apr. 27, 2014 (IBM/Westpac Teleconference).

BACKGROUND

Private cloud networks and hybrid cloud networks, which integrate a private cloud network with a public cloud network or with the Internet, may be adopted as an alternative to a traditional IT data-center.

Like other types of clouds, such a private cloud network may offer a catalog of services to users, but unlike a public cloud, resources of the private cloud are privately owned or are managed and maintained by a user or by a third party network-management resource retained by the user for this purpose.

Deploying a private cloud network may be a complex, time-consuming task that may comprise installing, configuring, interfacing, and debugging physical system, infrastructure, and networking resources, hypervisor applications, guest operating systems that each run under a hypervisor, virtual infrastructure, a cloud-management stack, middleware, applications, service catalogs, security systems, maintenance and management tools, virtual networks, and many other resources necessary to implement a cloud-computing environment.

Proprietary tools may in some cases ease this burden by automating an installation of certain components of a cloud-computing environment. But such tools are generally limited to specific virtualized applications, such as a database-management system or an transaction-processing application.

There is no way to automatically install an entire cloud-computing environment from scratch, either on a "bare-metal" platform, onto which no other operating software has been configured, or on a physical platform upon which only a basic virtualization layer has been installed.

BRIEF SUMMARY

A first embodiment of the present invention provides a method for automated deployment of a private modular cloud-computing environment, the method comprising:
  a processor of a computer system receiving user requirements;
  the processor identifying the private modular cloud-computing environment as a function of the user requirements, wherein the private modular cloud-computing environment comprises a set of modules, and wherein the identifying comprises selecting and configuring the set of modules;
  the processor selecting a set of module-deployment packages, wherein each package of the set of module-deployment packages comprises data and logic required to install and configure one or more modules of the set of modules; and
  the processor automatically installing and configuring the private modular cloud-computing environment on a base platform as a function of the data and logic comprised by the set of modules.

A second embodiment of the present invention provides a computer system comprising a processor, a memory coupled to the processor, and a computer-readable hardware storage device coupled to the processor, the storage device containing program code configured to be run by the processor via the memory to implement a method for automated deployment of a private modular cloud-computing environment, the method comprising:
  the processor receiving user requirements;
  the processor identifying the private modular cloud-computing environment as a function of the user requirements, wherein the private modular cloud-computing environment comprises a set of modules, and wherein the identifying comprises selecting and configuring the set of modules;
  the processor selecting a set of module-deployment packages, wherein each package of the set of module-deployment packages comprises data and logic required to install and configure one or more modules of the set of modules; and
  the processor automatically installing and configuring the private modular cloud-computing environment on a base platform as a function of the data and logic comprised by the set of modules, wherein the base platform is a bare-metal platform that comprises physical resources upon which neither virtualization software nor a virtual resource has been installed.

A third embodiment of the present invention provides a computer program product, comprising a computer-readable hardware storage device having a computer-readable program code stored therein, the program code configured to be executed by a processor of a computer system to implement a method for automated deployment of a private modular cloud-computing environment, the method comprising:
  the processor receiving user requirements;
  the processor identifying the private modular cloud-computing environment as a function of the user requirements, wherein the private modular cloud-computing environment comprises a set of modules, and wherein the identifying comprises selecting and configuring the set of modules;
  the processor selecting a set of module-deployment packages, wherein each package of the set of module-deployment packages comprises data and logic required to install and configure one or more modules of the set of modules; and
  the processor automatically installing and configuring the private modular cloud-computing environment on a base platform as a function of the data and logic comprised by the set of modules, wherein the base platform is a bare-metal platform that comprises physical resources upon which neither virtualization software nor a virtual resource has been installed.

DETAILED DESCRIPTION

Figure 1:
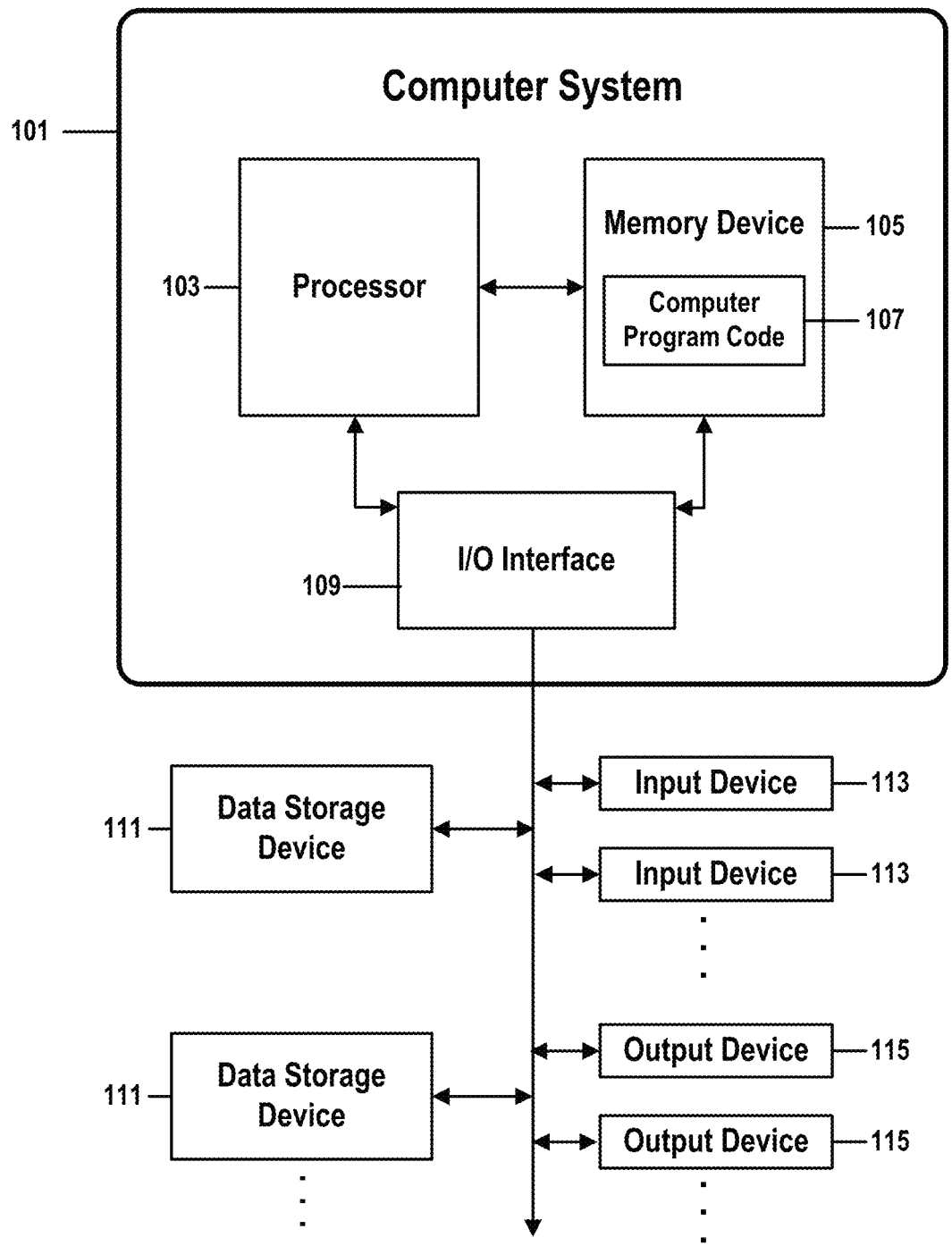
FIG. 1 shows a structure of a computer system and computer program code that may be used to implement a method for automated deployment of a private modular cloud-computing environment in accordance with embodiments of the present invention.

A cloud-computing environment allows users to conceptualize, provision, configure, and access virtualized computer services by methods that are fundamentally different than those of a traditional enterprise network or IT (information technology) data center. A cloud platform may be a complex, layered entity that can require months or years to install and configure.

In a traditional network environment, implementing a new application may require installing and configuring a vertical stack of physical resources that may comprise computers, storage devices, other peripheral devices, operating systems, application software, middleware, network interfaces, administration and management tools, and physical network infrastructure, as well as power and environmental-conditioning resources. Even if such a stack comprises virtual machines hosted by hypervisor virtual operating software, those virtual machines may be constrained to specific sets of physical resources of the application stack.

In this type of traditional computing environment, such a resource stack may be dedicated to a single application, making sharing or redistribution of resources between applications complex, or requiring multiple application stacks, each dedicated to a different application, to each be redundantly configured with excess capacity in order to handle each application's peak loads.

A cloud environment, however, may comprise layers of resources that have been abstracted or virtualized in order to allow physical resources to be transparently shared or dynamically reallocated among multiple applications when a level of demand shifts from one application to another.

The lowest layer of such a cloud platform may comprise physical computing, storage, and networking resources similar to those of a traditional enterprise network or IT-managed data center. A virtualization layer, which may comprise hypervisor operating software like Microsoft Hyper-V or VMware vSphere, may be configured on top of the physical-resource layer in order to abstract the physical layer from the higher-level virtualized resources visible to users.

These hypervisors allow virtual computers, storage, networks, and other types of virtual infrastructure to be provisioned, configured, or loaded with virtual "guest" operating systems and applications. Similarly, these virtualization capabilities may allow cloud users or administrators to provision and configure other cloud resources, such as virtual networks, storage, applications, and middleware, within one or more virtualized cloud environments.

In some cases, a cloud-director or cloud-management resource is further installed within the cloud's virtual environment. Such an application may provide to a user or administrator cloud-management services necessary to the operation of the cloud, such as virtual-machine provisioning functionality, a self-service user interface, resource-pooling facilities, inter-user security, or chargeback functions. In some examples, a cloud-management resource may comprise a stack of virtual infrastructure components, applications, middleware, or other resources dedicated to cloud management or maintenance. Such a stack may be installed as a virtual resource on top of the virtualization layer, and may provide a toolkit by which a user or administrator may build a cloud platform on top of the virtualization layer.

In such a virtualized environment, virtualizing software, such as a hypervisor, may thus allow an administrator or other user to dynamically create, migrate, configure or reconfigure, or allocate resources among a broad variety of virtual infrastructure components, networks, storage, middleware, or applications without manipulating physical resources.

In one example, a physical server computer might be running a copy of the vSphere hypervisor software, which allows an administrator or other user to provision and configure virtual machines connected to a virtual local-area network attached to the physical server. These networked machines might appear to the user to each comprise a Microsoft Windows server configured with a specified amount of memory and disk storage. The underlying server hardware would not be visible to the user, to whom the virtual computers would appear to be physical machines.

A cloud-computing environment may further leverage its virtualization capabilities by offering users a service catalog that enumerates a set of available cloud services. Such a service might, for example, allow users to provision a virtual machine, to run an application, or to adjust bandwidth of a virtual local-area network. In such cases, the user sees only the abstracted virtual infrastructure and applications. The physical computing and networking infrastructure beneath is not visible.

A cloud-computing environment's service catalog may comprise a "software as a service" ("SaaS") service, wherein a user may launch a software application that appears to run on the user's computer, but which actually resides on abstracted, virtualized cloud resources provisioned to run on the cloud's virtual infrastructure. One example of such an SaaS service is Google's Web-based Gmail email system. Accessible through a Web browser or smartphone, Gmail lets users access email messages through an email client application that appears to run on the user's local device, and as though the user's email were stored locally. But the Gmail application software and archived email messages are actually physically located on virtual cloud resources invisible to the user.

A cloud-computing environment may also offer an "infrastructure as a service" ("IaaS") service, which allows a system administrator or other user to manage components of a virtual computing infrastructure. Such components may include virtual computers, networks, storage devices, or other types of virtual resources that may have been provisioned in the virtualized cloud environment.

When a user elects to use such an IaaS service, the cloud provider retains the responsibility to maintain virtualization software, physical resources, and virtual infrastructure, while the IaaS user retains the ability to install its own platform on the virtual cloud infrastructure. Such a platform may comprise operating systems, applications, data, and middleware, and other virtual resources.

An IaaS service may therefore let users perform tasks like provisioning and installing virtual machines, setting up a Web-application server, configuring a virtual storage-area network, or performing any other type of network-management or administrative function that might be possible with an analogous physical infrastructure of a traditional enterprise network.

An other class of services that may be offered by a cloud-computing environment is a "platform as a service" ("PaaS") service. Here, the cloud presents to a developer or other user a comprehensive development environment comprised of virtual resources. In addition to virtualized servers, networks, storage, peripherals, and other virtual infrastructure components, such a comprehensive environment may include preinstalled operating systems, applications, development tools, administration and management tools, security software, or middleware, thus allowing the developer or user to focus on using the virtualized application, not on the underlying software infrastructure.

All of these components are implemented and maintained within the cloud platform as virtualized resources and may appear to the user as physical resources of a traditional network. Unlike resources of a traditional network, however, the virtual resources of a cloud-based PaaS service may be provisioned, configured, and managed without redeployment of the physical resources that underlie the cloud.

In one example, a database-application developer that does not want to purchase, install, and maintain hardware or software needed to create a robust development environment might license a virtual version of such an environment as a PaaS service of a cloud service provider. This PaaS might provide the developer a scalable, turnkey stack of virtual resources that include a set of developer's consoles configured in a virtual local-area network, a virtual machine configured to be an application server, a virtualized storage-area network, a virtualized internetwork, licensed enterprise copies of a database application, a dozen virtualized runtime user terminals, and virtualized middleware that transparently links the application under development to the developer's other virtual applications. In some embodiments, the user, or a third-party vendor licensed by the user, might be given access to the PaaS platform in order to install or maintain the database application or an other application.

Embodiments of the present invention may automatically deploy a comprehensive cloud-computing environment that may provide a combination of SaaS, IaaS, or PaaS services. In some embodiments, this environment may be deployed on a bare-metal platform, over a virtualization layer comprised of software running on physical resources, or on a higher-level partially implemented cloud-computing environment. In one example, an embodiment might allow users to automatically deploy modules onto an existing IaaS infrastructure in order to provide users a set of PaaS services.

In this document, we will generally discuss embodiments that automatically deploy modular cloud-computing environments on bare-metal platforms or over a virtualization layer, but this should not be construed to so limit the subject matter of the present invention.

A cloud computing environment may be public, private, or a hybrid of the two. A public cloud offers resources and services, such as software applications or storage space, available to the general public, sometimes over the Internet. A public cloud might, for example, be used to implement a Web service that allows users to upload and store large data files by means of a Web browser.

A private cloud is one that comprises resources that are owned, licensed, or managed by a private entity. A business might, for example, implement a private cloud on physical resources of its privately owned data center, or on physical resources leased from or managed by a third-party service provider. Because a private cloud is under the direct or indirect control of the private entity, its services may be reserved for its own use or for the use of its clients or business partners, or may not be offered to the general public.

A hybrid cloud may merge private and public clouds or network segments into a single cloud environment, wherein some services may be provided and managed by inhouse resources, while others are derived from the Internet or from other public clouds. In such cases, a boundary between a public region of the hybrid cloud and a private region of the hybrid cloud may not be visible to users.

Configuring a private or hybrid cloud from scratch may be referred to as a "bare-metal" installation when layers of virtualized cloud resources are installed on physical resources that have not yet been configured with even hypervisor virtualization software. Such a bare-metal installation may be complex and setting up a cloud environment capable of providing PaaS, IaaS, or SaaS services may require months or years of effort and tens of thousands of individual steps.

Embodiments of the present invention allow a user to configure, optimize, and deploy implement a modular cloud-computing platform, and to do so on a bare-metal platform, or on an other type of base platform, such as a virtualization layer installed on a bare-metal platform. Embodiments further provide a self-service interface that lets a user review and analyze the resulting deployed cloud's resource consumption characteristics and, in response, dynamically reconfigure or rescale modules of the cloud environment or of the services it provides.

FIG. 1 shows a structure of a computer system and computer program code that may be used to implement a method for automated deployment of a private modular cloud-computing environment in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for automated deployment of a private modular cloud-computing environment in accordance with embodiments of the present invention, and may implement other embodiments described in this specification, including the methods illustrated in FIGS. 1-5. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for automated deployment of a private modular cloud-computing environment.

Any of the components of the present invention could be created, integrated, hosted, maintained, deployed, managed, serviced, supported, etc. by a service provider who offers to facilitate a method for automated deployment of a private modular cloud-computing environment. Thus the present invention discloses a process for deploying or integrating computing infrastructure, comprising integrating computer-readable code into the computer system 101, wherein the code in combination with the computer system 101 is capable of performing a method for automated deployment of a private modular cloud-computing environment.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for cross-retail marketing based on analytics of multichannel clickstream data may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for cross-retail marketing based on analytics of multichannel clickstream data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
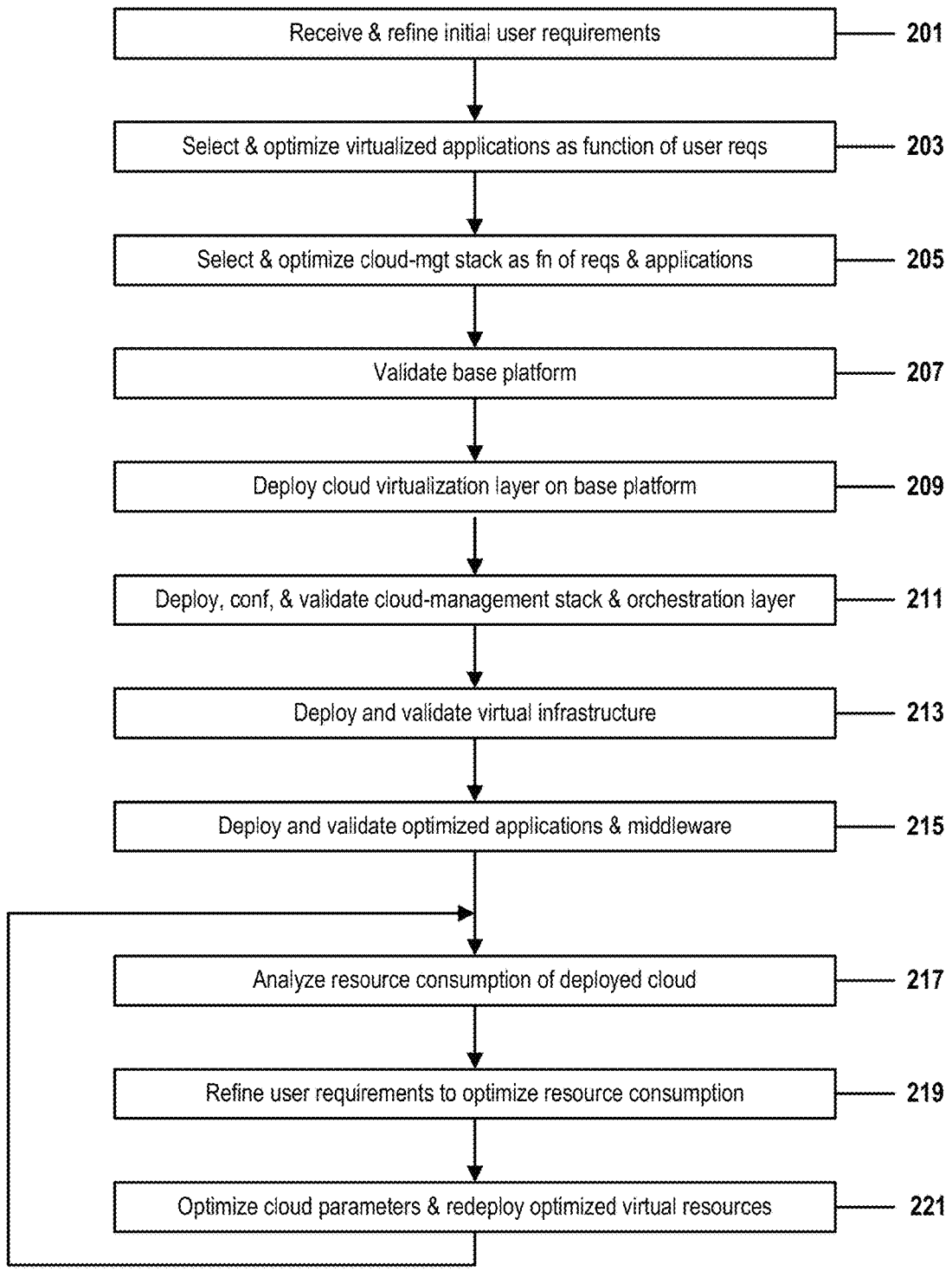
FIG. 2 is a flow chart that shows an overview of a method for automated deployment of a private modular cloud-computing environment in accordance with embodiments of the present invention.

FIG. 2 is a flow chart that shows an overview of a method for automated deployment of a private modular cloud-computing environment in accordance with embodiments of the present invention. FIG. 2 comprises steps 201-221.

Figure 3:
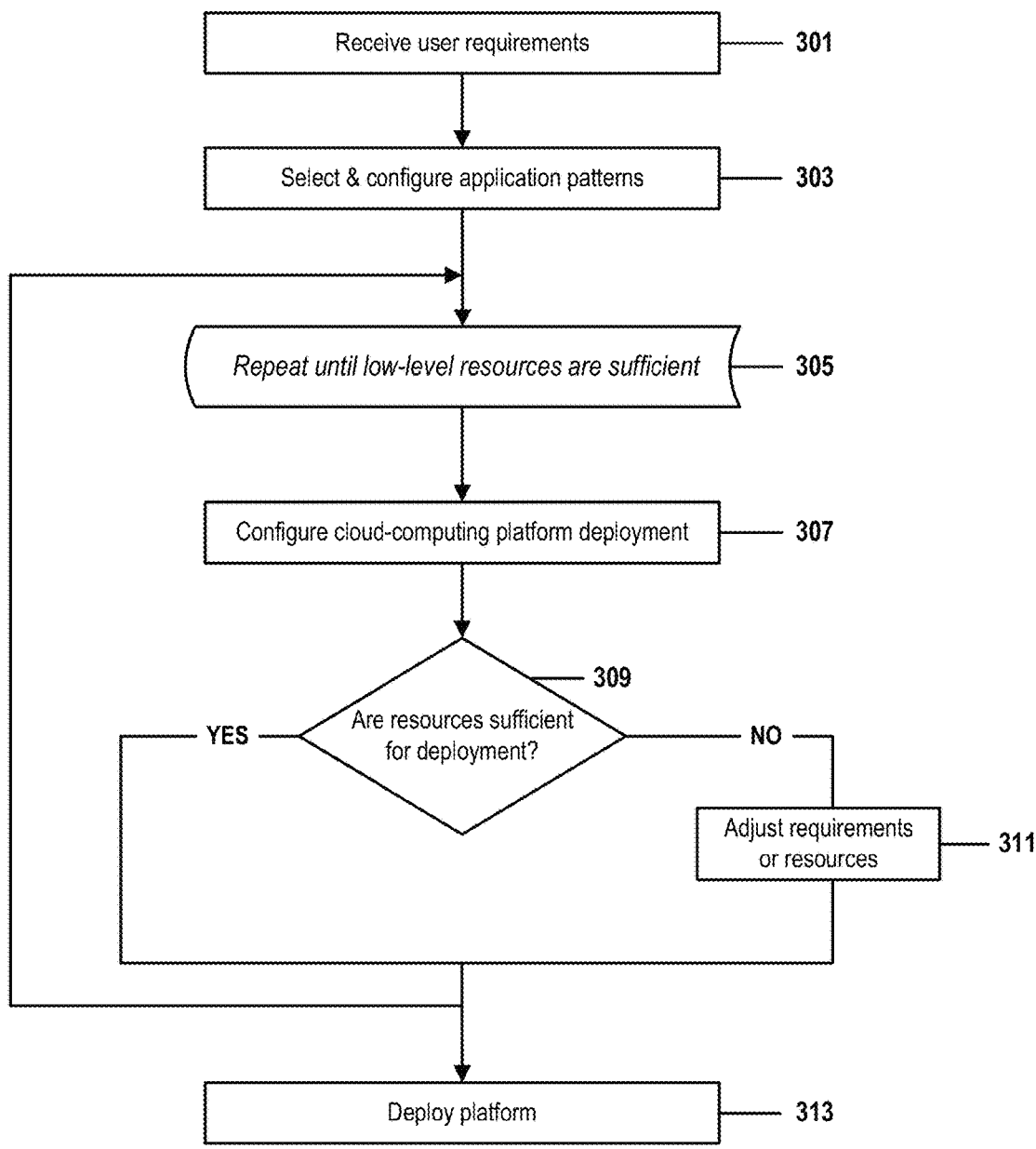
FIG. 3 is a flow chart that illustrates an alternative embodiment of the requirements-gathering and cloud-platform design steps of FIG. 2 in greater detail.
Figure 4:
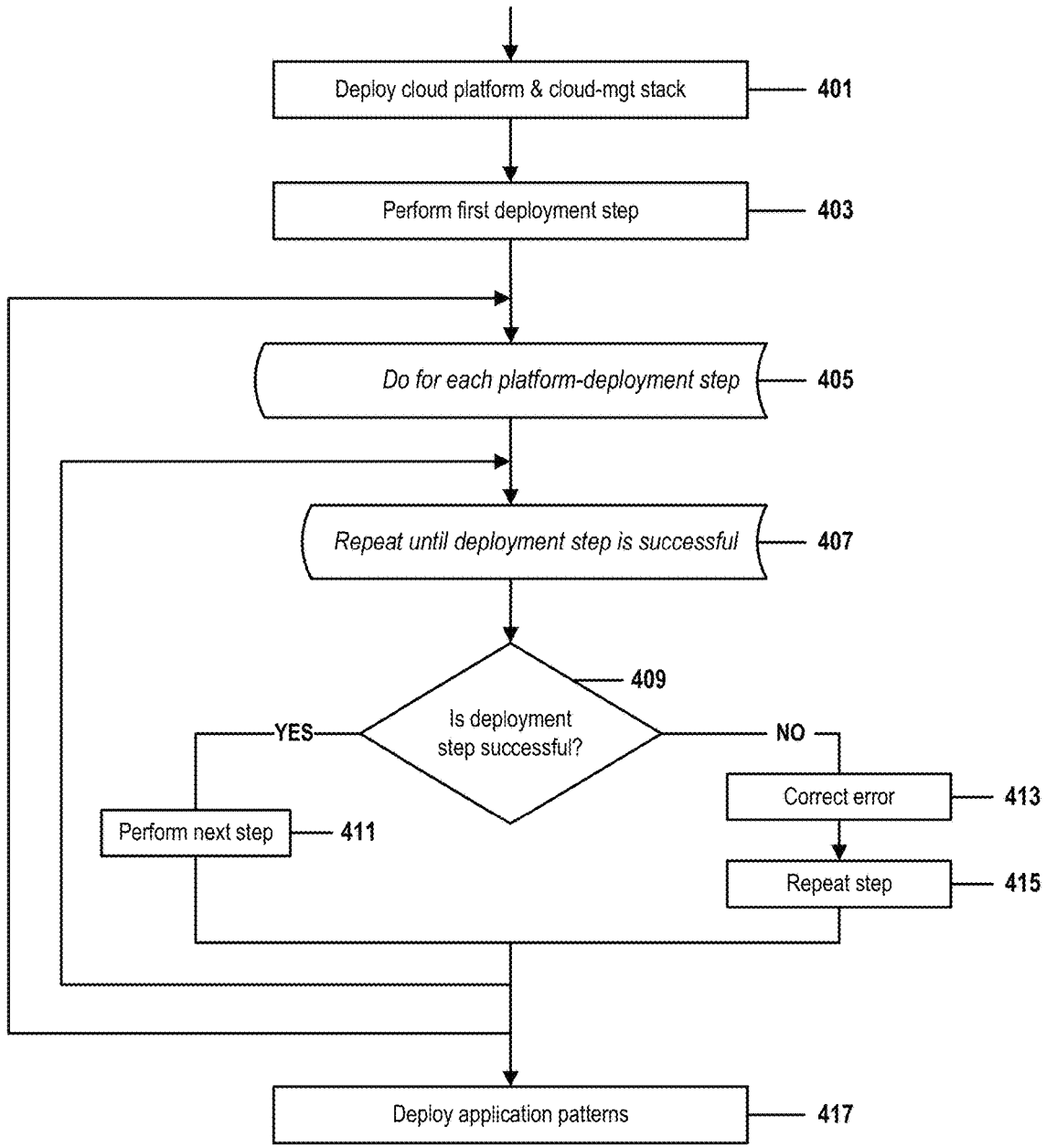
FIG. 4 is a flow chart that illustrates an alternative embodiment of the cloud-platform deployment steps of FIG. 2 in greater detail.
Figure 5:
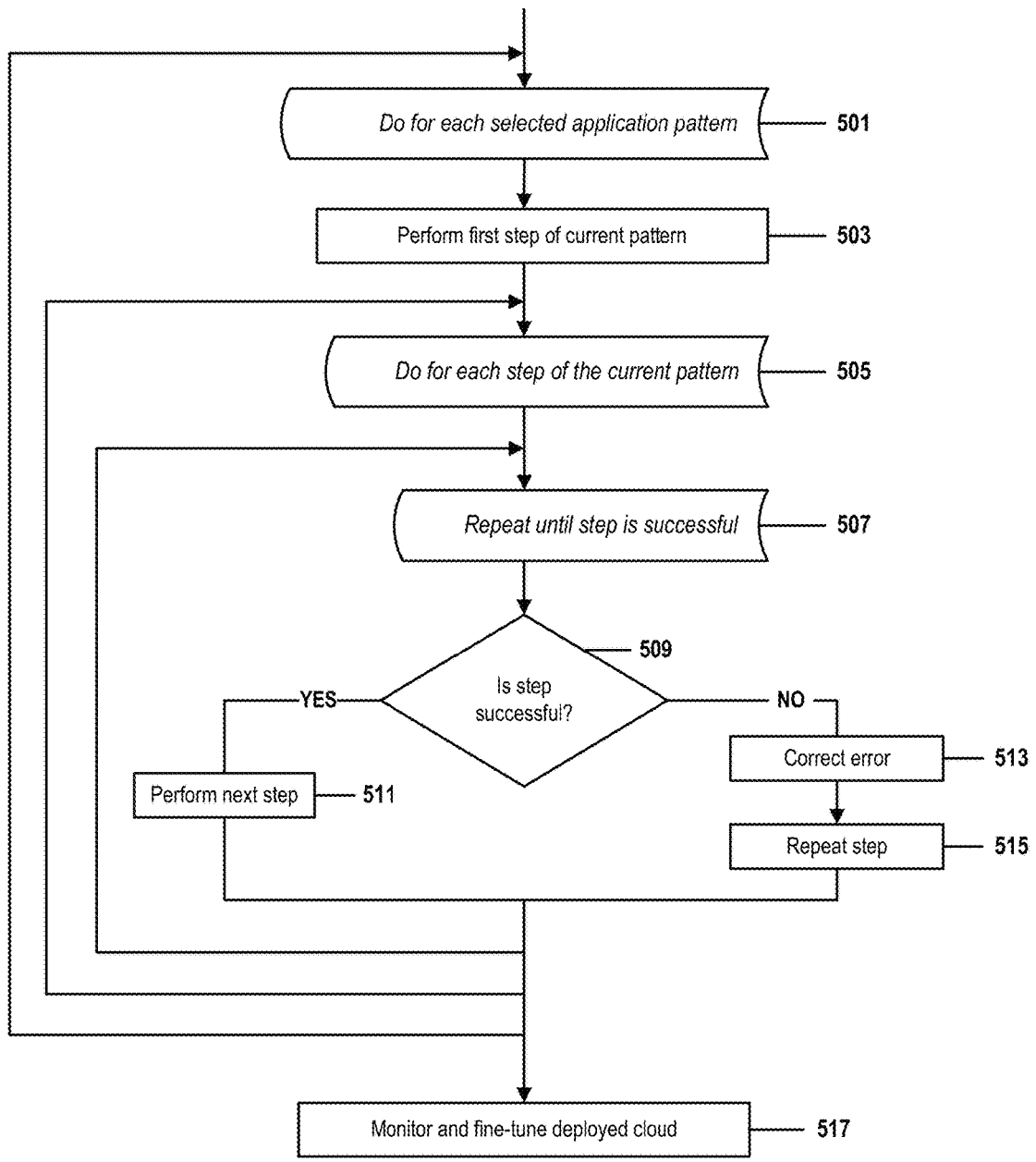
FIG. 5 is a flow chart that illustrates an alternative embodiment of the application pattern-deployment steps of FIG. 2 in greater detail.

FIG. 3 illustrates an alternative embodiment of the method of steps 201-207 of FIG. 2 in greater detail. FIG. 4 illustrates an alternative embodiment of the method of steps 209-215 of FIG. 2 in greater detail. FIG. 5 illustrates an alternative embodiment of the method of steps 217-221 of FIG. 2 in greater detail.

In step 201, one or more processors of a computer system receive, validate, refine, or analyze an initial set of user requirements. These requirements may identify a characteristic of the user's or of a user-business's information, data, cost, or business objectives. These requirements may, for example, identify: a minimum number of workstations that must have simultaneous access to a database application; a maximum acceptable response time from a user-hosted application; compatibility requirements among a set of transaction-processing systems; peak load capacity of an e-commerce application; reporting capabilities that must be provided by an integrated accounting system that is accessible by multiple business unit; or projected data-storage requirements for each quarter of the current fiscal year.

Additional requirements may be received all or in part from persons who possess knowledge of a user-business's information technology objectives or business objectives, from customers, partners, or colleagues of the user-business, or from industry analysts, information technology specialists, other types of experts, or publicly accessible references.

Many types of requirements may be identified, but in all cases, these requirements will be directly or indirectly related to a service that may be delivered by a cloud-computing environment to be deployed by an embodiment of the present invention.

In some cases, this receipt of user requirements may be performed by means of a questionnaire, a personal interview, an interactive automated question-and-answer session, a manual or automated examination of archived or current information records or behavioral patterns, or by a combination of other known methods of gathering information about a characteristic of a user or of a user's business.

In some embodiments, this step may further refine the received user requirements by organizing, aggregating, analyzing, comparing, or performing other steps that may identify or infer user characteristics related to a service that may be delivered by the cloud-computing environment to be deployed.

Such further refining may, for example, estimate a storage capacity that must be supplied by the cloud-computing environment as a function of the user's current storage requirements, of the user's projected growth figures, and of industry statistics that identify average data volume of applications similar to those that the user may deploy on the cloud-computing environment.

This further refining may be performed through automated means known to those skilled in the art, or may be performed manually by a person with expert knowledge of characteristics of the user, of the user's business, or of cloud-computing environments. In one example, a user may identify several types of storage requirements to an automated interactive questionnaire, which may then automatically forward these storage requirements to a software function that uses them to determine a total amount of storage that the user will require.

In step 203, the one or more processors identify and configure one or more applications that must be installed on the cloud-computing environment to be deployed, wherein this identifying and configuring may be performed as a combination of direct or indirect functions of the information received or analyzed in step 201.

In one example, if the received user information identifies a mission-critical need for an enterprise accounting function, in addition to requirements for supply-chain distribution, customer relationship management, and e-commerce applications, the one or more processors may select and configure an application solution based on IBM's OpenPro Enterprise ERP offering, which comprises the identified functionality. This selection and configuration, in conjunction with consideration of other requirements received or analyzed in step 201, may in turn allow the one or more processors to identify a need to install and configure an instance of the IBM DB2 database-management system.

In some embodiments, this selecting and configuring may be limited to requirements, functionality, or applications that have been preselected and incorporated into logic performed by the one or more processors. In the above example, such embodiments might comprise logic that responds to the cited user requirements by selecting an appropriate application from a small set of supply-chain, CRM, and e-commerce applications that have been identified and characterized by the embodiment. Logic embedded into the embodiment may then allow the selected application module to be configured to best satisfy needs of the user.

The configuration of each application selected in this manner may be identified automatically as a function of information received or analyzed in step 201, or it may be performed manually as a function of that information.

In some embodiments, the deployment of the selected application within the cloud environment may be automated as a function of a predefined "pattern" associated with the selected application.

Such pattern-based methods, which are known to those skilled in the art, may comprise a set of disk images, associated data, configuration rules, and installation instructions specific to one or more particular applications or classes of applications. In the above example, an instance of the DB2 application may be installed automatically by loading and running a predefined pattern that contains disk images, installation software, configuration tools, and other resources that allow the one or more processors to automatically install and configure DB2 into the cloud-computing environment in step 213.

Each application identified in this way may be associated with a similar installation pattern. If, however, the one or more processors determines in step 203 that the user requires an application for which no pattern has been generated, some embodiments may allow the application to be installed after a completion of step 211 by other manual or automated means known to those skilled in the art.

At the conclusion of step 203, the one or more processors will have identified and configured a set of applications that will be deployed within a cloud-computing environment, wherein the configuration of each application of the set of applications is a function of information selected and analyzed in step 201.

In step 205, the one or more processors use the information identified or analyzed in steps 201 and 203 to configure a cloud-computing environment optimized to meet the user's requirements. As described above, such an environment may comprise a layer of physical resources, a virtualization layer, and virtual resources provisioned by a cloud-management stack. These virtual resources may in aggregate comprise a modular virtual infrastructure capable of supporting an application identified in step 203.

One example of such a cloud-management stack is IBM Smart Cloud Orchestrator, which, when installed under a hypervisor of a virtualization layer, provides a stack of cloud-management resources These management resources may include software tools for provisioning, configuring, or deprovisioning virtual infrastructure components, for providing security among sets of assets owned by different tenants or users, and for other tasks related to setting up or managing a cloud-computing environment.

In some embodiments, a cloud-management stack may further comprise, or may interface with, an orchestration layer of the cloud-computing environment. An orchestration layer interfaces components of the cloud management stack with a user interface. Components of such an orchestration layer may, for example, interface the cloud-management stack to a "self-service dashboard" or resource-management interface, an electronic software control panel, or an other type of user interface.

A user may use such an interface to communicate instructions, preferences, or other expressions of the user's requirements to the orchestration layer, which translates the information received from the user interface into a format that may be understood by components of the cloud-management stack. The orchestration layer then forwards this translated, formatted information to a component of the cloud-management stack, allowing the stack component to automatically provision, configure, delete, or otherwise adjust modules of the cloud-computing environment to accommodate the user's communicated requirements.

In one example, a user may state, through a self-service dashboard interface, a requirement to add seventeen new users of a database application running on a virtual server. The user interface might respond by communicating this information to the orchestration layer, which would translate the information into instructions that direct the stack to provision seventeen new virtual user computers and to further modify existing virtual networking infrastructure as necessary to connect the new machines to the application, to previously deployed virtualized middleware, and to other cloud resources.

In other embodiments, the structure or organization of layers of the cloud-management stack, of the orchestration layer, of the virtualization layer, and of the user interface may be arranged differently. But even in such embodiments, functions analogous to those described here may be implemented, subject to constraints known to those skilled in the art.

The one or more processors may also in this step identify virtual additional resources required to deploy the cloud-computing environment, such as virtualized middleware, network administration, backup, and security functions, or a management function that allows a user to monitor and dynamically reconfigure cloud resources.

The one or more processors may in this step optimize the components of the cloud-computing environment through analytic steps known to those skilled in the art of cloud-computing management. This optimization may take the form of adding, moving, or reconfiguring components of the virtual infrastructure, or modifying characteristics of the physical layer.

In some embodiments, the one or more processors may in step 205 select one or more predefined module-deployment packages, wherein each package of the one or more module-deployment packages comprises data and logic necessary to deploy and configure one or more modules of the cloud-computing environment.

As described above, these modules may comprise any component of the cloud-computing platform, including a physical resource, a component of a virtualization layer of the cloud-computing environment, a virtual infrastructure component, a component of a cloud-management stack, a component of an orchestration layer of the cloud-computing environment, a virtual network, a middleware component, a cloud service, a cloud application, a security resource, and a user interface, or combinations thereof.

These packages may each be tailored to satisfy a specific set of user requirements and may comprise disk images, setup or configuration data, deployment instructions, installation requirements, and other information necessary to automatically deploy a module of a cloud-computing environment. Such a package may, for example, be tailored to deploy a cloud-management stack comprised of VMWare components, a virtual computer system, a middleware component that may interface an Oracle database implementation with certain types of accounting software, a virtual storage-area network, or a cloud-security software tool. In some embodiments, one or more configurations of these packages may be selected in standardized form, and then customized prior to deployment as a function of user requirements received and analyzed in step 201. In some embodiments, one or more of these packages may be selected and deployed in standardized form.

In some embodiments a plurality of these packages may be selected in a standardized group. For example, if a user requirement necessitates a selection of a package that deploys an Oracle database module, the one or more processors may, as a function of this selection, further select a related group of modules that will deploy middleware, a revision-management utility, a query-language, and development tools that will be bundled with the Oracle database upon deployment within the cloud.

At the conclusion of step 205, the one or more processors will have identified and configured components of a cloud-computing environment, including a physical layer, a virtualization layer, a virtual infrastructure, cloud applications, and whatever additional resources are required to install a fully functioning cloud platform on a base platform. In some embodiments, this base platform may be a bare-metal platform that comprises physical resources on which no software has been installed. In other embodiments, this base platform may comprise a platform that comprises a virtualization layer (such as one or more hypervisors, as described below) installed on physical resources of a bare-metal platform.

In this document, for the sake of simplicity, we will refer to such a base platform as a "bare-metal" platform. But this language should not be construed to imply that embodiments of the present invention are constrained to bare-metal deployments. Other embodiments of the method of FIG. 2 may comprise steps analogous to those discussed here, wherein those analogous steps automatically deploy a private, modular cloud-computing environment over a virtualization layer installed on a bare-metal platform. These analogous steps may include steps for validating previously deployed physical and virtualization layers.

If a configuration of the physical layer has not been provided to the one or more processors, it may also be derived in this step as a function of user requirements or other information received or analyzed in step 201 or as a function of identifications or configurations made in steps 203 and 205.

In step 207, the one or more processors validates the base platform by confirming that it meets requirements of each component of the applications, stack components, and other entities identified and configured in steps 203 and 205.

The one or more processors may, for example, in this step confirm that the physical resources on which the cloud-computing environment will be deployed comprise sufficient processor power, memory, and storage capacity to satisfy requirements of each software component to be installed. In another example, the processors may confirm that a physical network topology of the bare-metal platform provides sufficient bandwidth to support peak loads of a transaction-processing system that, when deployed as a virtualized cloud resource, will exchange large amounts of data with storage repositories external to the cloud environment.

In other cases, the one or more processors may determine whether the bare-metal platform's physical resources are sufficient to support an application identified in step 203 when that application creates additional resource requirements. Such additional requirements may be created as a function of the application's demands on a virtualized storage resource, a virtualized middleware component, or an other virtualized application identified in step 203. In such a case, the one or more processors may adjust a configuration of the other virtualized application or resource and, in response to this adjusting, refine other configuration details identified in steps 203 and 205.

If the processors in step 207 determine that the base-platform environment is incongruent with a user requirement, selection, or configuration of steps 201-205, the processors may report this incongruence to a user. In some embodiments, the processors might allow the user to then select a responsive course of action, where that action might comprise, but is not limited to: pausing performance of the method of FIG. 2 in order to adjust the configuration of physical resources; repeating the procedure of steps 201-207 with a revised set of user requirements; or continuing the procedure of FIG. 2 without taking further action in response to the report of incongruence.

In some embodiments, the processors may determine as a function of a characteristic of the incongruence whether to report or ignore an incongruence, or whether to pause, suspend, halt, or otherwise vary the procedure of FIG. 2. Such a determination may, for example, be made as a function of an identified severity of an incongruence, or as a function of a level of a cloud-platform layer of a resource that is affected by the incongruence or of a class of resource that is affected by the incongruence.

In one example, the one or more processors might halt a performance of a procedure of FIG. 2 if a bare-metal platform comprises insufficient physical resources to efficiently run desired hypervisor software, but might merely display a warning if they detect a non-fatal characteristic that may reduce performance, but not preclude required functionality.

In step 209, the one or more processors automatically deploy a virtualization layer on the validated bare-metal physical infrastructure, if such a virtualization layer has not already been installed.

This deployment may comprise, but is not limited to, steps known to those skilled in the art of deploying cloud computing environments. Such steps may comprise creating a virtualization layer by installing and configuring hypervisor software on one or more physical computer systems comprised by the bare-metal platform, where, by definition, operating software had not yet been installed on the physical processors. In other embodiments, the base platform onto which the cloud-computing environment will be installed may already comprise a hypervisor or other component of a virtualization layer.

Characteristics of this virtualization layer, and of the selection and configuration of software that is installed on the physical processors in order to create the layer, may be a function of a user requirement received or analyzed in step 201, of optimized application and cloud-management stack parameters identified in steps 203 and 205, or of a result of the validation or revision of the bare-metal or base platform in step 207.

Step 209 may further comprise other automated steps necessary to create a virtualization layer that may, in conjunction with the physical resources of a bare-metal platform, support the cloud-computing environment and applications selected and configured in steps 201-205. In some embodiments, these steps may comprise installing and configuring one or more components of the cloud-management stack selected and optimized in step 205.

In step 211, the one or more processors may continue implementing the cloud-computing environment by installing further components of the cloud-management stack, selected and optimized in step 205, that were not already installed and configured in step 209.

In some embodiments, this procedure may comprise deploying, configuring and validating an entire cloud-management stack and an orchestration layer of the cloud-computing environment. Here, as explained above, an orchestration layer comprises components that interface lower components of the cloud-management stack with a user interface, such as a software console, dashboard, an other type of graphical user interface, or a textual user interface. In some embodiments, such an orchestration layer may translate information entered by a user through the user interface into instructions, or into an other form, that may be capable of directing components of the cloud-management stack to install, revise, or remove a deployed module or other component of the cloud-computing environment.

In some embodiments, the one or more processors automatically verify that substantially all tasks comprised by steps 209 and 211 step complete successfully, as they are performed. Each such automatic task verification may be performed prior to a commencement of a next task and, in some cases, the next task may be made contingent upon a successful completion of a prior task or tasks. In other cases, wherein the processor or processors perform multiple tasks concurrently, or wherein task performances overlap in time, some or all such contingencies may not be efficient, practical, or possible.

Steps represented by some or all of these tasks may be known to those skilled in the art of cloud or application deployment, but others may be unique to an automated method of an embodiment of the present invention.

The automatic verification of steps comprised by steps 209 and 211 is one example of a characteristic of the method of FIG. 2 that cannot be performed during a traditional, partially automated or manual method of cloud deployment because of the complexity and enormous number of tasks—sometimes tens of thousands of tasks—typically involved in such a deployment, and of subtle dependencies among tasks.

One benefit of embodiments of the present invention is an automation of this entire process, such that an error condition or an undesired state may be automatically detected, reported, or corrected at deployment time. In a traditional manual deployment, it may not be possible to identify such an error condition or undesired state until so many other tasks have been completed or launched that the detection will have become extraordinarily difficult.

Furthermore, unlike a manual installation process, the one or more processors in this step may identify a failure of a step even when that failure would not prevent a performance of subsequent steps, or when the failure might not be detectible during a manual or partially automated installation until direct or indirect effects of the failure are identified at a later stage of the deployment process.

In step 213, the one or more processors deploy and validate remaining virtualized cloud infrastructure in a manner analogous to the deployments of steps 209 and 211. As with the virtualization-layer orchestration layer, and management-stack deployments, the infrastructure is here configured as a function of information received, analyzed, and derived in steps 201-205, and as a further function of characteristics of the bare-metal platform's physical resources.

If, for example, the one or more processors in step 203 identified a requirement for a distributed database-management application that requires a first server configuration, a second storage configuration, and a third communications-interface configuration, the one or more processors in step 213 might provision a virtual machine that conforms with the first server configuration, a virtual storage array that conforms with the second storage configuration, and a virtual local-area network that conforms with the third communications-interface configuration.

In other embodiments, other infrastructure may be provisioned and configured, so as to provide a platform suitable to host the applications selected and configured in step 203 and to satisfy user requirements received or analyzed in step 201. As in steps 207-211, the one or more processors may in step 213 automatically validate that each deployed component of this PaaS infrastructure is so suited to host the applications.

As in steps 207-211, the one or more processors may in step 213 further automatically and contemporaneously verify a successful completion of each task required to deploy and validate the PaaS infrastructure deployed in step 213.

In step 215, the one or more processors deploy and validate the applications identified and configured in step 203 in a manner analogous to the deployments of steps 209 and 211. In some embodiments, the one or more processors may further deploy and validate other virtualized entities associated with the applications, such as virtualized middleware, application-management utilities, security modules, or network-management tools.

As described above, each of these applications may be deployed in step 215 by means of an application "pattern" that comprises disk images, installation procedures, configuration guidelines, and other components that characterize the deployed, configured application. In some embodiments, step 215 may comprise automatically installing an application by means of other procedures that may be known to those skilled in the art.

As with previously deployed components, the virtualized entities installed in step 215 may be configured as a function of information received, analyzed, and derived in steps 201-205, or as a function of characteristics of the bare-metal platform's physical resources.

As in steps 207-213, the one or more processors may in step 215 automatically and contemporaneously validate that each component deployed in step 215 has been successfully installed and configured so as to satisfy user requirements received or analyzed in step 201. As in steps 207-213, the one or more processors may in step 215 further automatically and contemporaneously verify a successful completion of each task required to deploy and validate each component deployed in step 215.

At the conclusion of step 215, the one or more processors will have automatically configured, installed, and validated a complete cloud-computing environment capable of providing required SaaS, IaaS, or PaaS services. This cloud-computing environment will have been automatically deployed on a bare-metal or other base platform and may be comprised of modules selected and configured as a function of the information received or analyzed in step 201.

Steps 217-221 provide a feedback loop that may in some embodiments be performed repeatedly, continually, or continuously after the initial deployment of the cloud-computing environment in steps 201-215. This loop facilitates ongoing refinement of the cloud-computing environment, wherein the refinement is facilitated by the modularity of the environment and by the dynamic, requirement-driven configuration means of the modular platform.

In step 217, the one or more processors may identify, analyze, or report resource consumption or other characteristics of the cloud-computing environment. Such characteristics may, for example, characterize response times, a number failed or delayed resource requests, storage utilization figures, or values of other resource-related parameters related to a performance of the deployed cloud.

These characteristics may be aggregated, compared, organized, scaled, compared, or otherwise manipulated to more clearly identify or report information of interest. In some embodiments, they may be displayed to users or administrators by a "dashboard" user-interface application, or may be stored and updated in a stored worksheet of a spreadsheet program. Embodiments may comprise combinations of one or more other reporting mechanisms known to those skilled in the art.

In step 219, the one or more processors may automatically adjust user requirements in response to identification of information generated in step 217. In some embodiments, all or part of this adjustment may be performed manually by a user or administrator. In other embodiments, all or part of this adjustment may be performed automatically by the one or more processors in response to input provided by a user or administrator in response to a communication of information to the user or administrator in step 217.

In some embodiments, the one or more processors may automatically adjust requirements as part of a patch-management or software-revision validation function. Patch-management or module updating may, for example, be integrated into the dashboard as an automated service of a dashboard or of an other component of the deployed cloud-computing environment. Such an automated service might automatically identify a need to install a patch into, or otherwise update, a virtualized cloud module, and thus implicitly identify a user requirement without direct or contemporaneous user intervention. Other types of automated user-requirement monitoring and adjustment functions, and other types of automation, may be implemented into the method of step 219 in a similar way.

In step 221, the one or more processors may adjust characteristics of the cloud-computing environment, the virtualization layer, the cloud-management stack, the orchestration layer, virtual infrastructure, virtual applications, or an other component of the cloud deployed by the method of FIG. 2.

This adjusting may be performed by methods similar to those of earlier steps of the method of FIG. 2, or by analogous or simplified methods capable of optimizing the deployed cloud-computing environment or its modular components.

In some cases, this adjusting may comprise automatically adding or removing a module of the cloud-computing environment, or reconfiguring one or more modules or one or more other components associated with the one or more modules. In some cases, this adjusting may comprise automatically scaling the cloud-computing environment to accommodate a greater number of users, a greater workload, or a more dynamic workload. Similarly, this adjusting may comprise automatically scaling the cloud-computing environment to accommodate fewer users, a lesser workload, or a less dynamic workload.

Other types of adjustments may be performed automatically, and these adjustments may have characteristics in common with types of manual adjustments known to those skilled in the art of cloud management. In one example, the one or more processors in step 217 may identify that a database of a transaction-processing application has consumed more than 80% of its allocated storage capacity, and a user may in step 217 or 219 identify that an impending business merger is about to double the number of users of that application.

In response, the one or more processors might then in step 221 use known methods to determine how much storage capacity will be required to handle a workload likely to be generated by the increase in the number of users. This determining may be a further function of the historic storage-utilization figures identified in step 217.

In this example, the one or more processors may further determine, as a function of vendor-supplied application requirements, that a greater number of virtual processors, a larger virtual LAN, and additional middleware will be required to accommodate the new users. In response, the one or more processors would then reprovision or reconfigure virtual resources of the modular cloud in order to satisfy these refined requirements. In some embodiments, the one or more processors would further optimize the resulting virtual resources, based on historic usage patterns identified in step 217 or on user-reported requirements.

In some embodiments, the one or more processors might further validate that the physical resources of the cloud-computing environment are capable of supporting the updated configuration before attempting to deploy the updated configuration. If the one or more processors determine that the updating is not possible on existing physical resources, or that the updating may not be satisfactorily implemented on existing physical resources, the one or more processors may report the problem to a user or administrator. In some embodiments, the one or more processors may further recommend an adjustment to a configuration of the physical resources, or to the user requirements.

The iterative process of steps 217-221 may be performed on a scheduled basis, may run continuously, or may be triggered by a certain condition, such as an occurrence of an error or an identification of high bandwidth consumption. In some embodiments, the procedure of step 221 may comprise performing steps that perform all or part of the method of steps 201-215 or may comprise performing analogous steps only on those components of the modular cloud-computing environment that may be affected by step 219's refinement of user requirements.

FIG. 3 is a flow chart that illustrates an alternative embodiment of the method of steps 201-207 of FIG. 2 in greater detail. FIG. 3 contains steps 301-313.

In step 301, one or more processors of a computer system receive, validate, and refine an initial set of user requirements, as explained in the descriptions of steps 201 and 203 above.

In some embodiments, this step may refine the received user requirements by organizing, aggregating, comparing, or performing other analytical steps that may identify or infer characteristics related to the user or to a service that may be delivered by the cloud-computing environment to be deployed.

In step 303, the one or more processors identify and configure one or more applications that must be installed on the cloud-computing environment to be deployed. As explained in the description of step 203 above, this identifying and configuring may be performed as direct or indirect functions of the information received or analyzed in step 301.

In this embodiment, a deployment of each selected application within the cloud environment may be described or performed as a function of a predefined "pattern" associated with the selected application. Such a pattern may comprise one or more disk images and sets of instructions or scripts that together can install and configure one of the selected applications in the cloud environment. In some embodiments, predefined patterns will be available to facilitate the deployment of common applications or to facilitate common deployment configurations.

At the conclusion of step 303, the one or more processors will have identified and configured a set of applications and will have selected a set of application patterns, each of which corresponds to one of the identified applications.

Step 305 begins an iterative procedure of steps 305-311. This procedure will repeat until the one or more processors determines that the physical resources comprised by the bare-metal or other base platform onto which the cloud-computing environment is to be deployed are sufficient to support the virtualized applications identified and configured in step 303.

In some embodiments, the one or more processors may perform an analogous iterative procedure for each resource of a base platform, or for each resource of a subset of resources of a base platform. In such embodiments, the analogous method proceeds to step 313 only after the iterative process has determined that the particular resources under consideration are sufficient to enable deployment.

In step 307, the one or more processors use the information identified or analyzed in steps 301 and 303 to configure and optimize a cloud-computing environment that will meet the user requirements and that will be adequate to support the virtualized applications identified in step 303. As explained in the description of step 205, this configuring and optimizing may comprise configuring a virtualization layer, components of a cloud-management stack, a virtual infrastructure, or other modules comprised by the cloud-computing environment.

In step 309, the one or more processors determine whether the resources of the bare-metal platform or other base platform are sufficient to support the modular cloud-computing environment configured and optimized in step 307 and the virtualized applications identified in step 303.

If the processors determine in step 309 that the base-platform resources are sufficient, then the method of FIG. 3 concludes with deployment step 313, which is shown in greater detail in FIGS. 4 and 5.

If the processors determine in step 309 that the physical resources are insufficient or otherwise unable to satisfy user requirements, then the method of FIG. 3 continues with step 311 and the iterative procedure of steps 305-311 repeats.

In step 311, the one or more processors may perform any procedure necessary to ensure that the bare-metal or other base platform comprises physical resources that are sufficient and configured properly to support a cloud platform capable of satisfying user requirements.

Such a procedure may comprise, but is not limited to, combinations of: alerting a user or administrator that the bare-metal or other base platform cannot satisfy user requirements; suggesting revisions or additions to the physical resources that would allow them to satisfy user requirements; suggesting revisions to the user requirements that would allow existing physical resources of the bare-metal platform to satisfy the revised requirements; or allowing the user or administrator to take other steps necessary to resolve the insufficiency identified in step 309.

In some embodiments, this procedure may further comprise soliciting new or revised user requirements, repeating step 303's selecting and configuring of applications as a function of the updated requirements, or repeating step 307's configuring and optimizing of a module of the cloud-management stack or of an other module of the cloud-computing environment.

At the conclusion of step 311, the iterative process of steps 305-311 repeats in order to determine whether the bare-metal or other base platform can now properly support the planned cloud-computing environment.

At the conclusion of the last iteration of the iterative procedure of steps 305-311, the method of FIG. 3 will have validated the bare-metal or other base platform as being able to support a cloud-computing environment capable of satisfying a revised or optimized set of user requirements.

FIG. 4 is a flow chart that illustrates an alternative embodiment of a method of steps 209-215 of FIG. 2 in greater detail. FIG. 4 contains steps 401-417.

In step 401, the one or more processors, as explained in the description of steps 209 and 211, begin deploying and validating the cloud-computing environment, including the platform-management stack and orchestration layer identified and configured in step 307. This deployment procedure may comprise many thousands of steps, as explained in the description of steps 201 and 203 above.

In step 403, the one or more processors attempt to perform a first deployment step of this deployment procedure.

Step 405 begins an outer iterative procedure of steps 405-415, which repeats until the one or more processors determines that the entire platform-deployment procedure has completed successfully. In some embodiments, this iterative procedure may be performed once for each step of the platform-deployment procedure. In other embodiments, this iterative procedure may not be performed for certain steps or may be performed more than once for certain steps. In one example, the procedure may be performed once when a step is first initiated, and may be performed again later at the second completion of an other step that has the potential of disrupting a result of the first step.

Step 407 begins an inner iterative procedure of steps 407-415, which is nested within the outer iterative procedure of steps 405-415. This inner procedure is repeated for the platform-deployment step currently being evaluated by the outer procedure of steps 405-415, and continues to repeat until the one or more processors validate that current step as having been successful.

In step 409, the one or more processors determine whether the current deployment step under consideration was successful. During the first iteration of the iterative procedure of steps 405-415, the current deployment step may be the first step of the deployment procedure, first performed in step 403.

If the processors determine in step 409 that the current step was successful, then the processors continue with step 411, which performs the next step of the deployment procedure. The current iterations of the inner loop of steps 407-415 and of the outer loop of steps 405-415 both end and, if any further deployment steps remain, the next iteration of the outer loop begins with the performance of step 405.

If the processors determine in step 409 that the current step did not produce desired results or has not completed as expected, then the one or more processors continue with steps 413 and 415.

In step 413, the one or more processors may attempt to identify a reason why the current deployment step failed and may try to automatically correct the error, using techniques, steps, technologies, or other factors known to those skilled in the art of computer software.

In one example, if a deployment step of copying a disk image to a hard drive fails, the procedure of step 413 might attempt to confirm that the hard drive is operational, that the drive has available capacity sufficient to store the disk image, that the drive is properly formatted and partitioned, or that the drive has been provisioned correctly as a virtual resource.

In some embodiments, the one or more processors may in step 413 merely identify and report a failure of the current deployment step to a user or administrator. In some embodiments, the one or more processors may in step 413 report the failure to a user or administrator and suggest or recommend methods of correcting the error. In some embodiments, this suggesting or recommending may comprise an interactive debug procedure or other diagnostic technique or tool known to those skilled in the art.

In step 415, the one or more processors repeat or restart the current deployment step in order to allow the processors to determine, during a next iteration of step 409, whether the corrective action of step 413 was successful.

In some embodiments, if a certain number of iterations of the inner loop of steps 407-415 fail to correct an error, the method of FIG. 4 may halt, pause, or alert the user or administrator of the failure.

In some embodiments, if a certain number of iterations of the inner loop of steps 407-415 fail to correct an error, the method of FIG. 4 may, upon determining that the error does not rise to a threshold level of importance, or upon determining that the error may be corrected at a later time, continue with a next deployment step and perform a next iteration of the iterative procedure of steps 405-415.

At the conclusion of the last iteration of the iterative procedure of steps 405-415, which will have considered the final deployment step of the platform deployment procedure, the method of FIG. 4 will conclude with step 417. Step 417 comprises a deployment of one or more of the deployment patterns selected or configured during the performance of step 203 or of step 303. This procedure of pattern deployments is described in greater detail in FIG. 5.

FIG. 5 is a flow chart that illustrates an alternative embodiment of the method of steps 217-221 of FIG. 2 in greater detail. FIG. 5 contains steps 501-517.

Step 501 initiates an outermost iterative procedure of steps 501-515. During each iteration of this iterative procedure, the one or more processors, as explained in the description of step 215, deploy and validate one application pattern of the one or more application patterns identified in step 303.

This outermost iterative procedure begins with step 503, in which the one or more processors perform a first deployment step of the current application-pattern procedure being considered by the current iteration of the iterative process of steps 501-515.

Step 505 begins a middle nested iterative procedure of steps 505-515, which is nested within the outer iterative procedure of steps 503-515, and which repeats until the one or more processors determines that every step of the current application-pattern procedure has completed successfully. In some embodiments, this iterative procedure may be performed once for each step of the platform-deployment procedure. In other embodiments, this iterative procedure may not be performed for certain steps or may be performed more than once for certain steps. In one example, the procedure may be performed once when a step is first initiated, and may be performed again at the second completion of an other step that has the potential of disrupting the result of the first step.

Step 507 begins a third, innermost, iterative procedure of steps 507-515, which is nested within the middle iterative procedure of steps 505-515, and which repeats until the one or more processors validate a success of the current step of the application pattern being considered by the current iteration of the middle iterative procedure of steps 505-515.

In step 509, the one or more processors determine whether the most recent attempt to complete the current deployment step of the current application-pattern procedure was successful. During the first iteration of the middle iterative procedure of steps 505-515, this current deployment step may be the first step of the current application pattern, first performed in step 503.

If the processors determine in step 509 that the current step was successful, then the one or more processors continue with step 511, performing a next step of the current pattern. The current iterations of the innermost loop of steps 507-515 and of the middle loop of steps 505-515 then both end and, if any further steps of the current pattern remain to be deployed or validated, the next iteration of the iterative procedure of steps 505-515 begins with a performance of step 505.

If no further steps of the current application-pattern procedure remain to be deployed or validated, but if one or more application patterns remain to be deployed, the next iteration of the iterative procedure of steps 501-515 begins with step 501 by performing the first step of the next pattern.

If no further deployment steps of the current application-pattern procedure remain to be deployed or validated, and if no application patterns remain to be deployed, all three iterative procedures end and the method of FIG. 5 concludes with step 517, which initiates monitoring, feedback, and fine-tuning procedures, as explained in the description of steps 217-221 of FIG. 2.

If the one or more processors determine in step 509 that the current step of the current application pattern did not produce desired results or did not complete as expected, then the one or more processors attempt to automatically correct the problem by performing steps 513 and 515.

In step 513, the one or more processors attempt to identify a reason why the current deployment step failed and may further automatically attempt to correct the error, using techniques, steps, technologies, or other factors known to those skilled in the art of computer software. In some embodiments, the pattern itself may comprise procedural steps that identify, diagnose, or correct the problem.

In some embodiments, the one or more processors may in step 513 merely identify or report a failure of the current step to a user or administrator. In some embodiments, the one or more processors may in step 513 report a failure to a user or administrator and suggest or recommend a method of correcting the error. In some embodiments, this suggesting or recommending may comprise an interactive debug procedure or other diagnostic technique or tool known to those skilled in the art.

In step 515, the one or more processors repeat or restart the current deployment step in order to allow the processors to determine, in the next iteration of step 509, whether a corrective action of step 513 was successful.

In some embodiments, if a certain number of iterations of the innermost loop of steps 507-515 fail to correct an error, the method of FIG. 5 may halt or pause and alert the user or administrator of the problem. In some embodiments if an iteration of the innermost loop of steps 507-515 fail to correct an error, the method of FIG. 5 may perform a different diagnostic or corrective procedure during a next performance of step 513.

In some embodiments, if a certain number of iterations of the innermost loop of steps 507-515 fail to correct an error, the method of FIG. 5 may, upon determining that the error does not rise to a threshold level of importance, or upon determining that the error may be corrected at a later time, continue with a next deployment step by initiating a next iteration of the middle-nested iterative procedure of steps 505-515 or of the outermost iterative procedure of steps 501-515.

What is claimed is:

1. A method for automated deployment of a private modular cloud-computing environment, the method comprising:
    a processor of a computer system receiving user requirements;
    the processor identifying the private modular cloud-computing environment as a function of the user requirements, wherein the private modular cloud-computing environment comprises a set of configurable software modules, and wherein the identifying comprises selecting and configuring the set of configurable software modules;
    the processor selecting a set of module-deployment packages, wherein each package of the set of module-deployment packages comprises data and logic required to install and configure one or more modules of the set of configurable software modules;
    the processor automatically installing and configuring the private modular cloud-computing environment on a base platform as a function of the data and logic comprised by the set of configurable software modules, wherein the base platform is a bare-metal platform that comprises physical resources upon which neither virtualization software nor a virtual resource has been installed; and
    the processor validating the bare-metal platform, wherein the validating confirms that the physical resources comprised by the bare-metal platform are able to support the cloud-computing environment.

2. The method of claim 1, wherein a first module of the set of configurable software modules is selected from a group comprising: a physical resource, a component of a virtualization layer of the cloud-computing environment, a virtual infrastructure component, a component of a cloud-management stack, a component of an orchestration layer of the cloud-computing environment, a virtual network, a middleware component, a cloud service, a cloud application, a security resource, and a user interface.

3. The method of claim 1, wherein the automatically installing and configuring comprises:
    the processor automatically installing and configuring a cloud-management stack and an orchestration layer on a virtualization layer of the base platform;
    the processor automatically installing and configuring virtual infrastructure on the virtualization layer; and the processor automatically installing and configuring middleware and at least one application on the virtual infrastructure.

4. The method of claim 1, wherein the automatically installing and configuring comprises:
the processor automatically installing and configuring a virtualization layer on the bare-metal platform;
the processor automatically installing and configuring a cloud-management stack and an orchestration layer on the virtualization layer;
the processor automatically installing and configuring virtual infrastructure on the virtualization layer; and
the processor automatically installing and configuring middleware and at least one application and middleware on the virtual infrastructure.

5. The method of claim 1, wherein data comprised by a first package of the set of module-deployment packages comprises a disk image.

6. The method of claim 1, wherein logic comprised by a second package of the set of module-deployment packages comprises a first set of computer instructions for installing and configuring a second module of the set of configurable software modules.

7. The method of claim 6, wherein a first instruction of the first set of computer instructions launches a third package of the set of module-deployment packages.

8. The method of claim 6, wherein the automatically installing and configuring comprises:
the processor verifying a successful performance of a current instruction of the first set of computer instructions, wherein the verifying is performed contemporaneously with or immediately following a performance of the current instruction.

9. The method of claim 1, further comprising:
the processor automatically monitoring and analyzing a resource consumption of the deployed private modular cloud-computing environment; and
the processor adjusting a configuration of a third module of the set of configurable software modules as a function of the analyzing.

10. The method of claim 9, wherein the adjusting comprises:
the processor reformatting a redeployment instruction into a format that may be understood by a component of an orchestration layer of the cloud-computing environment, wherein the redeployment instruction is selected as a function of the monitoring and analyzing; and
the processor performing a redeployment operation identified by the component of the orchestration layer, wherein the operation directs a component of the cloud-management stack to adjust the configuration of the third module as a function of the redeployment instruction.

11. The method of claim 9, further comprising:
the processor revising a configuration of a fourth package of the set of module-deployment packages as a function of the analyzing, wherein the fourth package comprises a second set of computer instructions for installing and configuring the third module, and wherein the adjusting is performed as a function of the revising.

12. The method of claim 1, further comprising providing at least one support service for at least one of creating, integrating, hosting, maintaining, and deploying computer-readable program code in the computer system, wherein the computer-readable program code in combination with the computer system is configured to implement the receiving, the identifying, the selecting the set of module-deployment packages, and the automatically installing and configuring.

13. A computer system comprising a processor, a memory coupled to the processor, and a computer-readable hardware storage device coupled to the processor, the storage device containing program code configured to be run by the processor via the memory to implement a method for automated deployment of a private modular cloud-computing environment, the method comprising:
the processor receiving user requirements;
the processor identifying the private modular cloud-computing environment as a function of the user requirements, wherein the private modular cloud-computing environment comprises a set of configurable software modules, and wherein the identifying comprises selecting and configuring the set of configurable software modules;
the processor selecting a set of module-deployment packages, wherein each package of the set of module-deployment packages comprises data and logic required to install and configure one or more modules of the set of configurable software modules;
the processor automatically installing and configuring the private modular cloud-computing environment on a base platform as a function of the data and logic comprised by the set of configurable software modules, wherein the base platform is a bare-metal platform that comprises physical resources upon which neither virtualization software nor a virtual resource has been installed; and
the processor validating the bare-metal platform, wherein the validating confirms that the physical resources comprised by the bare-metal platform are able to support the cloud-computing environment.

14. The computer system of claim 13, wherein the automatically installing and configuring comprises:
the processor automatically installing and configuring a virtualization layer on the bare-metal platform;
the processor automatically installing and configuring a cloud-management stack and an orchestration layer on the virtualization layer;
the processor automatically installing and configuring virtual infrastructure on the virtualization layer; and
the processor automatically installing and configuring middleware and at least one application and middleware on the virtual infrastructure.

15. The computer system of claim 13, further comprising:
the processor automatically monitoring and analyzing a resource consumption of the deployed private modular cloud-computing environment; and
the processor adjusting a configuration of a third module of the set of configurable software modules as a function of the analyzing.

16. A computer program product, comprising a computer-readable hardware storage device having a computer-readable program code stored therein, the program code configured to be executed by a processor of a computer system to implement a method for automated deployment of a private modular cloud-computing environment, the method comprising:
the processor receiving user requirements;
the processor identifying the private modular cloud-computing environment as a function of the user requirements, wherein the private modular cloud-computing environment comprises a set of configurable software modules, and wherein the identifying comprises selecting and configuring the set of configurable software modules;

the processor selecting a set of module-deployment packages, wherein each package of the set of module-deployment packages comprises data and logic required to install and configure one or more modules of the set of configurable software modules;

the processor automatically installing and configuring the private modular cloud-computing environment on a base platform as a function of the data and logic comprised by the set of configurable software modules, wherein the base platform is a bare-metal platform that comprises physical resources upon which neither virtualization software nor a virtual resource has been installed; and the processor validating the bare-metal platform, wherein the validating confirms that the physical resources comprised by the bare-metal platform are able to support the cloud-computing environment.

17. The computer program product of claim 16, wherein the automatically installing and configuring comprises:

the processor automatically installing and configuring a virtualization layer on the bare-metal platform;

the processor automatically installing and configuring a cloud-management stack and an orchestration layer on the virtualization layer;

the processor automatically installing and configuring virtual infrastructure on the virtualization layer; and the processor automatically installing and configuring middleware and at least one application on the virtual infrastructure.

18. The computer program product of claim 16, further comprising:

the processor automatically monitoring and analyzing a resource consumption of the deployed private modular cloud-computing environment; and the processor adjusting a configuration of a third module of the set of configurable software modules as a function of the analyzing.

* * * * *